United States Patent
Classon et al.

(10) Patent No.: US 7,606,574 B2
(45) Date of Patent: Oct. 20, 2009

(54) METHOD AND APPARATUS FOR IMPLEMENTING SPATIAL DIVISION MULTIPLE ACCESS ("SDMA") TO COMMUNICATE USER DATA AND BACKHAUL DATA WITH THE SAME WIRELESS TIME-FREQUENCY RESOURCES

(75) Inventors: Brian K. Classon, Palatine, IL (US); Michael D. Kotzin, Buffalo Grove, IL (US); Frederick W. Vook, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 485 days.

(21) Appl. No.: 11/330,474

(22) Filed: Jan. 12, 2006

(65) Prior Publication Data

US 2007/0160019 A1    Jul. 12, 2007

(51) Int. Cl.
 *H04W 72/00*     (2006.01)
(52) U.S. Cl. .................... 455/450; 455/451; 455/452.1; 455/453
(58) Field of Classification Search .................. 455/450, 455/451, 452.1, 453
See application file for complete search history.

(56) References Cited

U.S. PATENT DOCUMENTS

| | | | | |
|---|---|---|---|---|
| 6,137,784 | A * | 10/2000 | Wallerius et al. | 370/328 |
| 6,349,094 | B1 * | 2/2002 | Vastano et al. | 370/328 |
| 6,870,808 | B1 | 3/2005 | Liu et al. | |
| 7,197,313 | B1 * | 3/2007 | Sohn | 455/450 |
| 2003/0153316 | A1 * | 8/2003 | Noll et al. | 455/446 |
| 2004/0095907 | A1 * | 5/2004 | Agee et al. | 370/334 |
| 2005/0059342 | A1 | 3/2005 | Engels et al. | |
| 2005/0113120 | A1 | 5/2005 | Rappaport et al. | |
| 2006/0164972 | A1 * | 7/2006 | van Rensburg et al. | 370/208 |
| 2008/0069031 | A1 * | 3/2008 | Zhang et al. | 370/328 |

\* cited by examiner

*Primary Examiner*—Joseph H Feild
*Assistant Examiner*—Huy D Nguyen

(57) ABSTRACT

A system [100] includes a base station [105] to communicate wireless data with at least one user terminal [125, 130] within a cell serviced by the base station [105]. A central backhaul access point [135] communicates wireless backhaul data with the base station [105]. At least a first portion of the wireless data and a second portion of the wireless backhaul data is communicated via Spatial Division Multiple Access ("SDMA"), and the first portion of the wireless data utilizes at least some same time-frequency resources as the second portion of the wireless backhaul data.

14 Claims, 2 Drawing Sheets

METHOD AND APPARATUS FOR IMPLEMENTING SPATIAL DIVISION MULTIPLE ACCESS ("SDMA") TO COMMUNICATE USER DATA AND BACKHAUL DATA WITH THE SAME WIRELESS TIME-FREQUENCY RESOURCES

TECHNICAL FIELD

This invention relates generally to the use of the same wireless time-frequency resources for both communicating both user data and backhaul data via SDMA.

BACKGROUND

Mobile communications networks typically utilize a plurality of base stations to connect user terminals to a wireless network. Each of the user terminals communicates with a base station to exchange information with the wireless network when located in a cell area serviced by the base station. The base station transmits backhaul data back and forth with a core network via a backhaul link.

The transmission of backhaul data via wired connections is expensive and can cause delay in wireless development. Wireless backhaul, on the other hand, typically uses separate time/frequency resources from those of the wireless data such as, e.g., an alternate system offering services on a different bandwidth allocation. These separate resources, however, may not be available or offer an acceptable range/quality such as, e.g., unlicensed spectrum.

There are systems in the art in which communication on the same time-frequency resources can be achieved via spatial separation with an antenna array, a practice known as Spatial Division Multiple Access ("SDMA"). In SDMA, an antenna array forms multiple spatial channels to allow several communication links to share the same time frequency resources. A receive antenna array employs multiple receive beamformers, each arranged to receive one communication link, while spatially suppressing the other communication links. Similarly, a transmit antenna array employs multiple transmit beamformers, each arranged to transmit one communication link towards its intended recipient while transmitting it away from other receivers through transmit spatial nulling.

There are wireless backhaul systems in the art that handle the use of backhaul communications by using backhaul repeaters in communication with one or more base stations to forward backhaul communications from the base station(s) to a backhaul access point, and the multiple backhaul links share the same time frequency resources via the practice of SDMA. These systems, however, utilize separate frequency resources for backhaul and for normal wireless data communications. In cellular systems in the initial phase of deployment, such backhaul systems may not be usable because the separate time-frequency resources may not be available.

There are wireless cellular systems in the art that employ SDMA to enable multiple wireless data communication links between wireless users and a base station to share the same time-frequency resources. However, the backhaul traffic for these systems is either handled with wired links (which can prevent rapid network deployment) or use wireless backhaul links on a different spectral allocations (which in some cases might be unavailable) or steal time-frequency resources from the wireless data traffic (which severely reduces network efficiency). Accordingly, current wireless systems are complex and inefficient.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present invention. Also, common and well-understood elements that are useful or necessary in a commercially feasible embodiment are often not depicted in order to facilitate a less obstructed view of these various embodiments of the present invention.

DETAILED DESCRIPTION

Generally speaking, pursuant to these various embodiments, a method and system are provided that utilize the same time and frequency resources to simultaneously transmit both backhaul data and user terminal data directly from a base station to a backhaul access point and user terminals. Spatial Division Multiple Access ("SDMA") is utilized for this communication. According to this method and system, neither separate time or frequency resources, nor a dedicated carrier are required. By utilizing the same time and frequency resources an efficient multiplexing of backhaul data and user terminal data is achieved.

SDMA is the practice of using array-processing techniques to permit multiple users of a wireless system to share the same time and frequency resources. In SDMA systems, users are multiplexed in the spatial domain instead of in the code domain as is done in Code Division Multiple Access ("CDMA"). Therefore, no additional bandwidth is required for SDMA other than that required for channel estimation, link maintenance, and so forth. SDMA systems may be generally described in the context of an antenna array operating at a base station that is communicating with multiple single-antenna subscriber devices.

Figure 1:
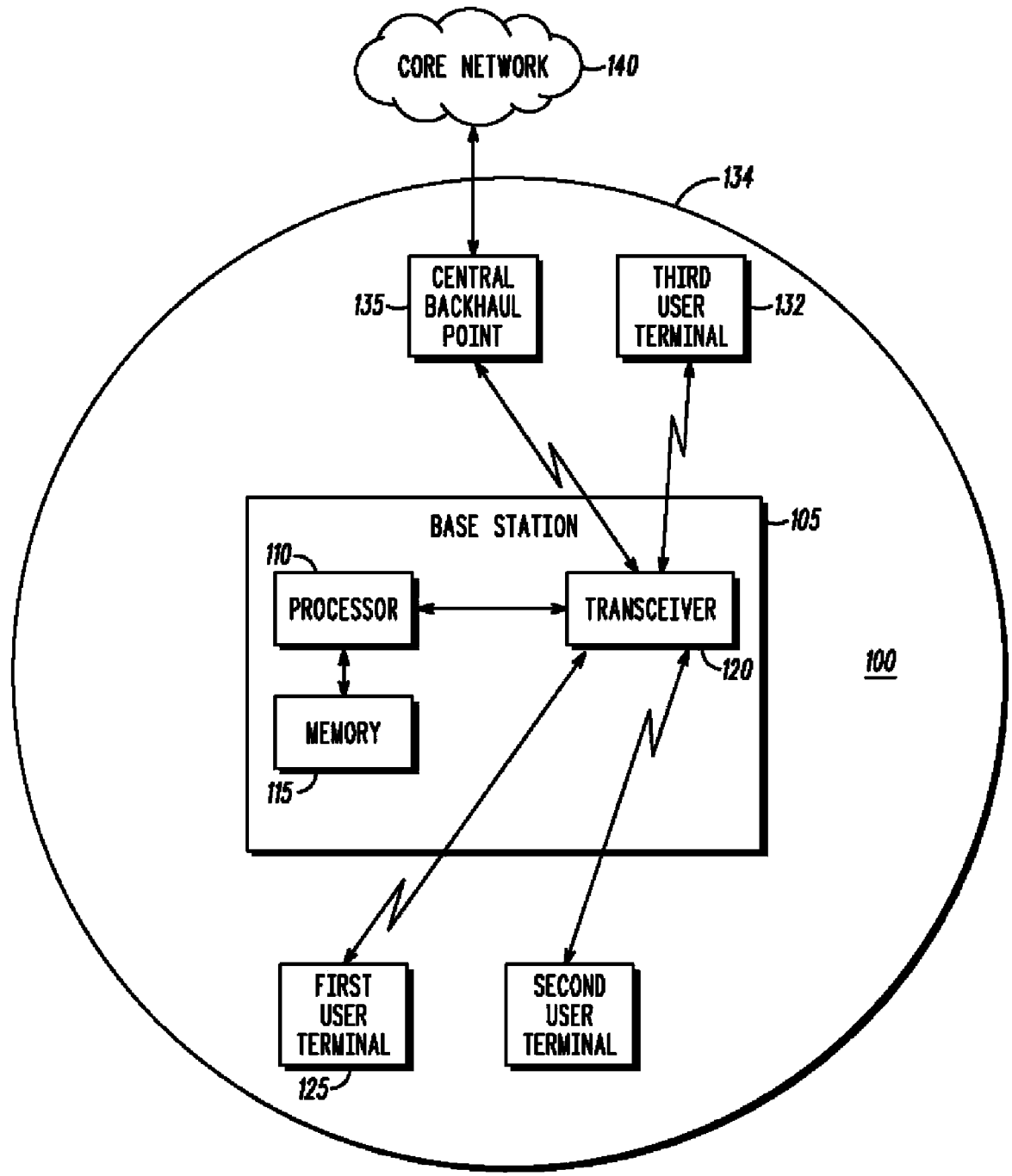
FIG. 1 illustrates a wireless system according to an embodiment of the invention.

FIG. 1 illustrates a wireless system 100 according to an embodiment of the invention. As shown, the wireless system 100 includes a base station 105. The base station 105 has a processor 110, a memory 115, and a transceiver 120. The transceiver 120 may comprise an antenna array operating in a transmit mode and/or receive mode. The memory 115 may store programmable program code to be executed by the processor 110. The transceiver 120 may communicate wireless data with a first user terminal 125, a second user terminal 130, and a third user terminal 132 within cell 134. The first user terminal 125, the second user terminal 130, and the third user terminal 132 may each comprise, e.g., a cellular telephone or other wireless platform of choice. The transceiver 120 is also utilized to communicate wireless backhaul data to a central backhaul point 135.

Although not illustrated, additional base stations may also be in communication with the central backhaul point 135. The central backhaul point 135 may, in turn, be in communication with a core network 140. The communication link between the central backhaul point 135 and the core network 140 may comprise, e.g., a hard-wired link. When a call is made on, e.g., the first user terminal 125, wireless data is transmitted to the transceiver 120. The base station 105 then wirelessly transmits corresponding backhaul data to the central backhaul point 135 via the transceiver 120. The central backhaul point 135 subsequently transmits the backhaul data to the core network 140 which may route the appropriate data to a base station servicing the corresponding user terminal being called.

This base station 105 and its antenna array 120 communicate in both the downlink direction (transmit) and the uplink (receive) direction. For example, communications in the downlink direction may include communications of wireless data from the base station 105 to any of the first user terminal 125, the second user terminal 130, or the third user terminal 132, as well as communications of backhaul data to the central backhaul point 135. In the uplink direction, wireless data may be transmitted from the first user terminal 125, the second user terminal 130, or the third user terminal 132 to the base station 105 as well as communications of backhaul data from the central backhaul point 135.

Backhaul data may also be transmitted in the uplink direction from the central backhaul point 135 to the base station 105. In the uplink direction, multiple user terminals such as the first user terminal 125, the second user terminal 130, and the third user terminal 132 may transmit wireless data to the base station 105 on the same time-frequency resources as those utilized for transmitting backhaul data from the central backhaul point 135 to the base station 105. The base station 105 uses receive SDMA processing techniques to separate the transmissions based on the distinct vector channel responses of the transmitting user terminals and the central backhaul point 135 relative to the antenna array within the base station's 105 transceiver 120.

Backhaul data may also be transmitted in the downlink direction from the base station 105 to the central backhaul point 135. In the downlink direction, the base station may use transmit SDMA to transmit wireless data to multiple user terminals such as the first user terminal 125, the second user terminal 130, and the third user terminal 132 on the same time-frequency resources as those utilized for transmitting backhaul data from the base station 105 to the central backhaul point 135. In downlink transmit SDMA, multiple independent data signals are beam-formed with a transmit array in such a way as to form non-interfering spatial channels between the transmit array and the central backhaul point 135 and each user terminal such as, e.g., the first user terminal 125, the second user terminal 130, and the third user terminal 132.

The processor 110 of the base station 105 generates an SDMA data frame. The SDMA data frame includes both the backhaul data and wireless user data. The processor 110 generates the SDMA frame such that both the backhaul data the wireless user data are transmitted as efficiently as possible. The amount of backhaul data needed may vary on a frame-by-frame basis depending on system conditions. For the best statistical multiplexing, all of the time-frequency resources in a frame are available for normal data communications. The amount of backhaul required is calculated by the processor 110, and a fraction of a frame is allocated for the backhaul such as, e.g., the first ⅓ of a frame from the beginning. After the portion of the frame is allocated for backhaul, the wireless user data is added to the frame. For example, in the downlink direction, the same subcarriers and Orthogonal Frequency-Division Multiplexing ("OFDM") symbols may be utilized to simultaneously transmit both the backhaul data and the wireless user data via SDMA. This may occur in certain circumstances such as when the central backhaul point 135 and a user terminal with which the base station is communicating have channel responses that enable the transmit SDMA beamforming operations to create spatial channels that are sufficiently separated, such that there is substantially no interference or cross-talk in the communication of the respective backhaul data and wireless user data between these distinct entities.

Figure 2:
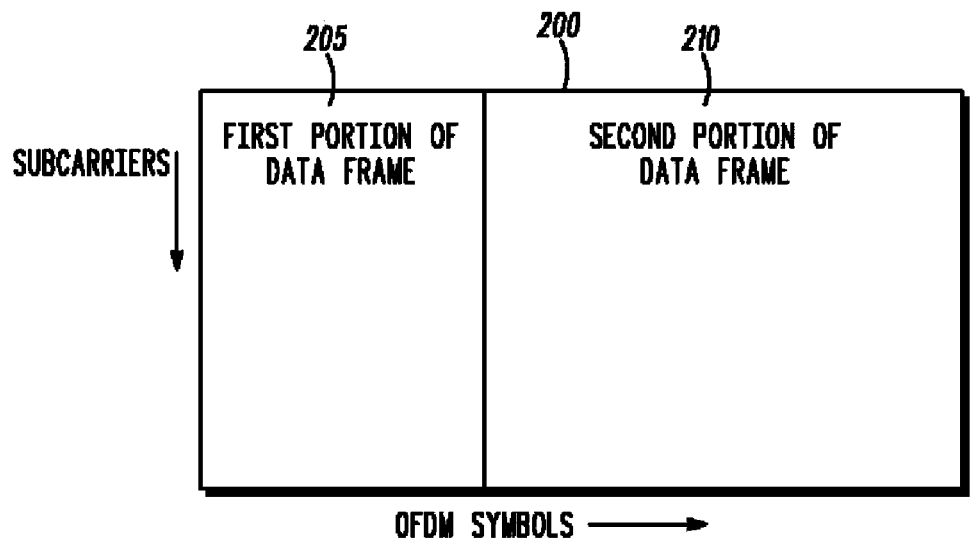
FIG. 2 illustrates a data frame according to an embodiment of the invention.

FIG. 2 illustrates a data frame 200 according to an embodiment of the invention. The data frame 200 includes a plurality of subcarriers and a plurality of OFDM symbols. As discussed above, the data frame 200 is portioned into two portions. A first portion 205 of the data frame 200 includes SDMA wireless backhaul data and wireless user data. A second portion 210 of the data frame 200 includes wireless user data only, i.e., there is no wireless backhaul data in the second portion 210. Note that the first portion 205 does not necessarily have to encompass OFDM symbols that are earlier than the symbols allocated to the second portion. Similarly, the first portion 205 does not necessarily have to encompass all subcarriers of the OFDM symbols. In some embodiments, the first portion occupies a "rectangle" of OFDM subcarriers and symbols. In another embodiment, the first portion can occupy a set of disjoint subcarriers and symbols.

User data is selected for the backhaul portion of the data frame 200 such that SDMA communication may be made with the first user terminal 125, the second user terminal 130, or the third user terminal 132 and with the central backhaul point 135 at the same time with the same frequency resources. If the angular location (or more specifically the vector channel responses) of a user terminal and the central backhaul point 135 are similar, however, and SDMA performance would suffer from the inability to adequately separate the user terminal, then that user terminal may be scheduled for the second portion 205 of the data frame 200, i.e., the non-backhaul portion.

In an embodiment, only the 2-dimensional angle is considered and wireless user data is overlapped with the backhaul data only if the user terminals' transmissions are in substantially opposite directions (e.g., substantially different directions) of the central backhaul point 135. Referring to FIG. 1, the central backhaul point 135 and each of the first user terminal 125 and the second user terminal 130 are located in substantially opposite directions. The third user terminal 132 and the central backhaul point 135 are not, however, located in substantially opposite directions. Instead, the third user terminal 132 and the central backhaul point 135 are located in relatively close proximity to each other. As a result, if backhaul data were to be sent from the base station 105 at the same time that wireless user data is sent from the base station 105 to the third user terminal 132, interference between the transmitted signals could result, interrupting or degrading system performance.

Accordingly, wireless data to be sent to either the first user terminal 125 or the second user terminal 130 may be located within the same portion, i.e., the first portion 205, of the data frame 200 having backhaul data to be sent to the central backhaul point 135. Wireless user data to be sent to the third user terminal 132, on the other hand, would be included only in the part of the data frame 200 having only wireless user data and no backhaul data, i.e., the second portion 210, to ensure the most reliable communication of such data.

Figure 3:
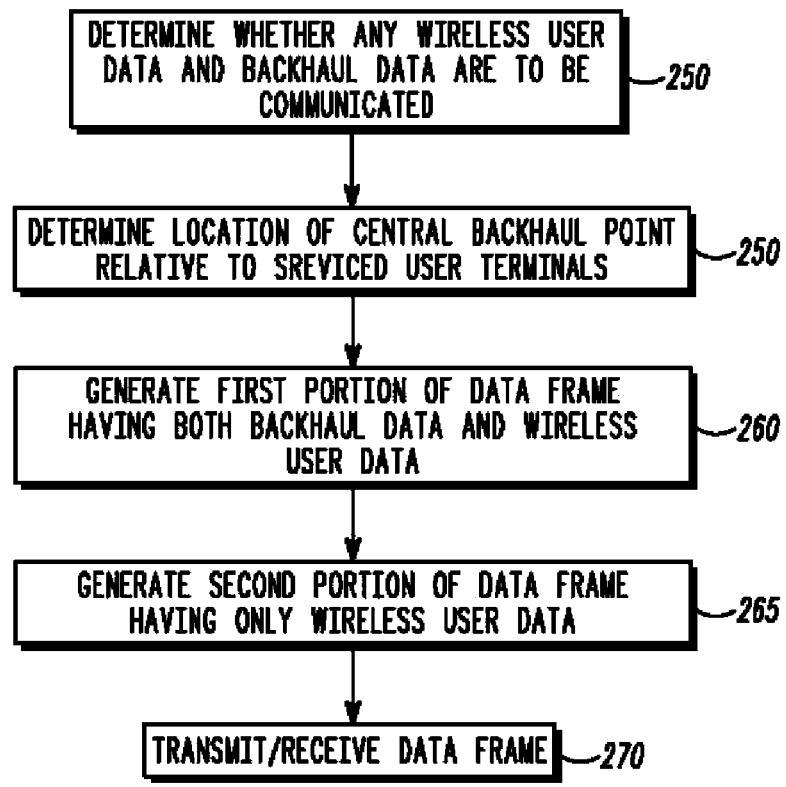
FIG. 3 illustrates a method of simultaneously communicating wireless data and wireless backhaul data according to an embodiment of the invention.

FIG. 3 illustrates a method of simultaneously communicating wireless data and wireless backhaul data according to an embodiment of the invention. To begin, at operation 250, as discussed above, the processor 110 of the base station 105 determines whether any wireless user data and/or backhaul data is to be communicated. Next, at operation 255, the processor 110 determines the location information of the central backhaul point 135 relative to any serviced user terminals with which the base station 105 is to communicate wireless user data. For example, the base station 105 may be in communication with the first user terminal 125, the second user terminal 130, and the third user terminal 132. The location determination is made at operation 255 so that the processor 110 can determine which wireless user data may be communicated via SDMA at the same time as backhaul data without resulting in interference. For example, the location determination may be angular location or vector channel responses of a user terminal and the central backhaul point 135.

Next, at operation 260, the processor 110 generates the first portion 205 of a data frame 200 having both the backhaul data and the wireless data. The same time and frequency resources are utilized to transmit/receive both the wireless user data and the backhaul data within the first portion 205 of the data frame 200. For example, the base station 105 may include wireless user data to be communicated with the first user terminal 125 and/or the second user terminal 130 in the first portion 205, along with the backhaul data. Next, at operation 265, the processor 110 generates the second portion 210 of the data frame 200. The second portion 210 may include only wireless user data. For example, the second portion 210 may include wireless user data to be communicated between the base station 105 and the third user terminal 132. The wireless user data to be communicated with the third user terminal 132 is included in this second portion 210, i.e., the non-backhaul portion, because it is likely that interference would result if this wireless user data were transmitted at the same time as the backhaul data because of the close proximity of the central backhaul point 135 and the third user terminal 132. Finally, at operation 270, the data frame 200 is communicated. For example, on a downlink communication, the data frame 200 is transmitted by the transceiver 120 of the base station 105. Conversely, on an uplink communication, the data frame 200 is received by the transceiver 120 of the base station 105.

In certain propagation environments, specifically those with a high amount of multipath scattering, the angular locations of the user terminal and/or a central backhaul point may not affect significantly SDMA performance. In those environments, the operation 255 of determining the locations is not necessary, and is therefore not performed. In such an embodiment, the flow from operation 250 in FIG. 3 proceeds directly to operation 260. Other criteria, such as information on pending traffic, can then be used to determine which transmissions will be scheduled in the first portion and which transmissions will be scheduled in the second portion.

As discussed above, the wireless user data and the backhaul data are communicated via OFDM symbols. The allocation of the wireless user data and the backhaul data may be performed on a frame-to-frame basis such that the relative sizes of the first portion 205 and the second portion 210 may change from frame-to-frame based on wireless backhaul data needs. The first portion 205 and the second portion 210 of the data frame 200 may be contiguous sets of OFDM symbols. When a user terminal is rapidly moving through a cell 134 serviced by the base station 105, the processor 110 of the base station 105 may keep the wireless user data to be transmitted to the moving user terminal separate from the backhaul data even though the user terminal is not currently too close to the central backhaul point 135 such that interference with the transmission of backhaul data would likely result. The reason why this user data would be allocated this way is because as the user terminal moves through the cell the processor 110 may determine that there is a likelihood that interference might soon result based on the user terminal's movement. In making this determination, the processor 110 may consider the user terminal's velocity and/or direction of movement. For example when the moving user terminal's velocity and a Doppler measurement (or a measurement of the channel response variability or how rapidly the channel response varies) of the user terminal exceed a preset threshold, its user data may be allocated solely to the second portion 210, i.e., the non-backhaul portion, of the data frame 200. The user data may also be allocated to the second portion 210 when the user terminal is near an edge of the base station's 105 communication range. A user terminal for which only the second portion 210 of the data frame 200 is to be used may also be assigned a low modulation and coding rate.

Pursuant to these various embodiments described above, a method and system are provided that utilize the same time and frequency resources to simultaneously transmit both backhaul data and user data directly from a base station to a central backhaul point and user terminals. SDMA is utilized for this communication. According to this method and system, neither separate time or frequency resources, nor a dedicated carrier are required for the backhaul traffic. By utilizing the same time and frequency resources, a good multiplexing of backhaul and user data is achieved.

Those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept.

We claim:

1. A method, comprising:
    communicating wireless backhaul data between a base station and a central backhaul access point;
    communicating wireless data between the base station and at least one user terminal within a cell serviced by the base station;
    allocating a first amount of time-frequency resources for both the wireless data and the wireless backhaul data, and allocating a second amount of the time-frequency resources for only one of the wireless data and the wireless backhaul data, wherein the at least some same time-frequency resources comprise at least part of the first amount; and
    wherein at least a first portion of a data frame including Orthogonal Frequency-Division Multiplexing ("OFDM") symbols for at least wireless backhaul data and a second portion of the data frame for the wireless data is communicated via Spatial Division Multiple Access ("SDMA"), and the first portion of the data frame utilizes at least some same time-frequency resources as the second portion of the data frame and wherein the first amount and the second amount of the time-frequency resources are contiguous sets of OFDM symbols.

2. The method of claim 1, wherein communicating the wireless backhaul data is performed from the base station to the central backhaul access point, and communicating the wireless data is performed downlink from the base station to the at least one user terminal.

3. The method of claim 1, wherein communicating the wireless backhaul data is performed from the central backhaul access point to the base station, and communicating the wireless data is performed uplink from the at least one user terminal to the base station.

4. The method of claim 1, wherein the allocating is at least one of performed within a data frame, and changed on a frame-to-frame basis based on wireless backhaul data needs.

5. The method of claim 1, further including communicating via a second time-frequency resources with a second user terminal, wherein the second time-frequency resources comprise at least part of the second amount.

6. The method of claim 5, wherein at least one of the second user terminal's velocity and a Doppler measurement and channel response variability of the second user terminal is above a threshold value.

7. The method of claim 5, wherein the second user is near an edge of the base station's communication range.

8. The method of claim 5, further including assigning the second user terminal a low modulation and coding rate.

9. A system, comprising:

a base station to communicate wireless data with at least one user terminal within a cell serviced by the base station;

a central backhaul access point to communicate wireless backhaul data with the base station; and wherein a first amount of time-frequency resources is allocated for both the wireless data and the wireless backhaul data, and a second amount of the time-frequency resources is allocated for only one of the wireless data and the wireless backhaul data, wherein the at least some same time-frequency resources comprise at least part of the first amount; and wherein at least a first portion of a data frame including Orthogonal Frequency-Division Multiplexing ("OFDM") symbols for at least wireless backhaul data and a second portion of the data frame for the wireless data is communicated via Spatial Division Multiple Access ("SDMA"), and the first portion of the data frame utilizes at least some same time-frequency resources as the second portion of the data frame and wherein the first amount and the second amount of the time-frequency resources are contiguous sets of OFDM symbols.

10. The system of claim 9, wherein the central backhaul access point is disposed from the base station such that the wireless backhaul data flows from the base station to the central backhaul access point, and the at least one user terminal is disposed downlink from the base station such that the wireless data flows downlink from the base station to the at least one user terminal.

11. The system of claim 9, wherein the central backhaul access point is disposed from the base station such that the wireless backhaul data flows from the central backhaul access point to the base station, and the at least one user terminal is disposed uplink from the base station such that the wireless data flows uplink from at least one user terminal to the base station.

12. A base station, comprising:

a processor to process wireless data and wireless backhaul data; and a transceiver to communicate the wireless data with at least one user terminal within a cell serviced by the base station, and to communicate the wireless backhaul data with a central backhaul access point; and wherein a first amount of time-frequency resources is allocated for both the wireless data and the wireless backhaul data, and a second amount of the time-frequency resources is allocated for only one of the wireless data and the wireless backhaul data, wherein the at least some same time-frequency resources comprise at least part of the first amount; and wherein at least a first portion of a data frame including Orthogonal Frequency-Division Multiplexing ("OFDM") symbols for at least wireless backhaul data and a second portion of the data frame for the wireless data is communicated via Spatial Division Multiple Access ("SDMA"), and the first portion of the data frame utilizes at least some same time-frequency resources as the second portion of the data frame and wherein the first amount and the second amount of the time-frequency resources are contiguous sets of OFDM symbols.

13. The base station of claim 12, wherein the central backhaul access point is disposed from the base station such that the wireless backhaul data flows from the base station to the central backhaul access point, and the at least one user terminal is disposed downlink from the base station such that the wireless data flows downlink from the base station to the at least one user terminal.

14. The base station of claim 12, wherein the central backhaul access point is disposed from the base station such that the wireless backhaul data flows from the central backhaul access point to the base station, and the at least one user terminal is disposed uplink from the base station such that the wireless data flows uplink from the at least one user terminal to the base station.

* * * * *